United States Patent
Boyer et al.

(10) Patent No.: US 7,096,734 B2
(45) Date of Patent: Aug. 29, 2006

(54) THERMAL ACCELEROMETER WITH REDUCED SENSITIVITY TO EXTERNAL MAGNETIC FIELDS

(75) Inventors: André Boyer, Montpellier (FR); Alain Renault, Pontoise (FR); Bernard Varusio, Taverny (FR); Alain Giani, Montpellier (FR)

(73) Assignee: Sagem SA, Paris (FR)

( * ) Notice: Subject to any disclaimer, the term of this patent is extended or adjusted under 35 U.S.C. 154(b) by 0 days.

(21) Appl. No.: 11/007,167

(22) Filed: Dec. 9, 2004

(65) Prior Publication Data

US 2005/0132801 A1    Jun. 23, 2005

(30) Foreign Application Priority Data

Dec. 22, 2003   (FR)   ................... 03 15135

(51) Int. Cl.
*G01P 15/00* (2006.01)
(52) U.S. Cl. .................. 73/514.16; 73/514.09
(58) Field of Classification Search ............. 73/514.16
See application file for complete search history.

(56) References Cited

U.S. PATENT DOCUMENTS 4,232,553 A * 11/1980 Benedetto et al. ........ 73/514.03

6,453,571 B1   9/2002 Crossan, Jr.

FOREIGN PATENT DOCUMENTS

EP   0 664 456 A1   7/1995
FR   2 817 351 A1   5/2002

OTHER PUBLICATIONS

Leung, A.M. et al., "Micromachined Accelerometer Based on Convection Heat Transfer", Micro Electro Mechanical Systems, 1998. Mems 98. Proceedings., The Eleventh Annual International Workshop on Heidelberg, Germany, Jan. 25-29, 1998, New York, NY, USA, IEEE, US, pp. 627-630.

* cited by examiner

*Primary Examiner*—Hezron Williams
*Assistant Examiner*—Tamiko Bellamy
(74) *Attorney, Agent, or Firm*—Birch, Stewart, Kolasch & Birch, LLP

(57) ABSTRACT

The thermal accelerometer of the invention comprises an enclosure having disposed therein a central filament powered by alternating electric current of zero mean amplitude and having a frequency lying between first and second resonant modes of vibration of the central filament, the central filament lying between detector filaments adjacent to reaction filaments powered by alternating electric current of zero mean amplitude and having a frequency lying between the first and second resonant modes of vibration of the reaction filaments.

4 Claims, 1 Drawing Sheet

THERMAL ACCELEROMETER WITH REDUCED SENSITIVITY TO EXTERNAL MAGNETIC FIELDS

The present invention relates to a thermal accelerometer.

BACKGROUND OF THE INVENTION

Thermal accelerometers are known that comprise an enclosure in which a central filament is disposed that is connected to a power supply member delivering electricity, and that lies between two detector filaments connected to a member for comparing the temperatures of the detector filaments. When the accelerometer is used for measuring the acceleration to which the vehicle carrying the accelerometer is subjected, the central filament is raised to a high temperature by using a direct current (DC) power supply. The temperature gradient about the central filament is a function of the acceleration to which the accelerometer is subjected. Measuring a temperature difference between the detector filaments thus makes it possible to calculate the acceleration to which the accelerometer is being subjected. To ensure that the electronics performing the calculation operates correctly, it is known to power the detector filaments with alternating current (AC). The central filament is not concerned by this accuracy constraint, which explains why it can be powered with DC.

In order to increase the speed and the accuracy with which acceleration is determined, proposals are made in document FR-A-2 817 351 to dispose reaction filaments adjacent to the detector filaments, which reaction filaments are connected to power supply members delivering the reaction filaments with electrical reaction currents in the form of same-sign DC or of pulses. Under such circumstances, a reaction filament is powered in such a manner as to balance the temperature difference between the detector filaments, and acceleration measurement is performed by measuring the power needed to achieve such balance.

In both cases, unexplained measurement errors have been observed under conditions where the accelerometer was subject to the same accelerations.

OBJECT OF THE INVENTION

An object of the invention is to minimize the measurement errors of prior devices.

BRIEF SUMMARY OF THE INVENTION

In order to achieve this object, the invention provides a thermal accelerometer comprising an enclosure having disposed therein a central filament connected to a power supply member delivering electric current, and disposed between two detector filaments connected to a member for comparing the temperatures of the detector filaments, in which the electric current delivered to the central filament is alternating current of zero mean amplitude and having a frequency greater than a first resonant mode of vibration of the central filament.

In accordance with an observation that forms part of the invention, it has been found that the errors come from parasitic deformation of the central filament due to electromagnetic forces under the effect of a DC or low frequency external magnetic field when the central filament is powered with DC. Powering the central filament with AC having a zero mean amplitude and at a frequency that is high enough makes it possible to obtain a significant reduction in the deformation of the central filament under the effect of an external magnetic field, such that the corresponding errors are eliminated.

In an advantageous version of the invention, the alternating current is at a frequency lying between the first resonant mode of vibration of the central filament and a second resonant mode of vibration of the central filament.

According to another advantageous aspect of the invention, for a thermal accelerometer that also includes reaction filaments, the reaction filaments are powered with a reaction electric current of zero mean amplitude at a frequency that is greater than a defined first resonant mode of vibration. This produces the same error-reducing effects as for the central filament.

BRIEF DESCRIPTION OF THE DRAWING

Other characteristics and advantages of the invention will appear on reading the following description of a preferred, non-limiting embodiment of the invention given with reference to the sole accompanying FIGURE, which is a diagrammatic illustration of a thermal accelerometer to which the invention applies.

DETAILED DESCRIPTION OF THE INVENTION

Figure 1:
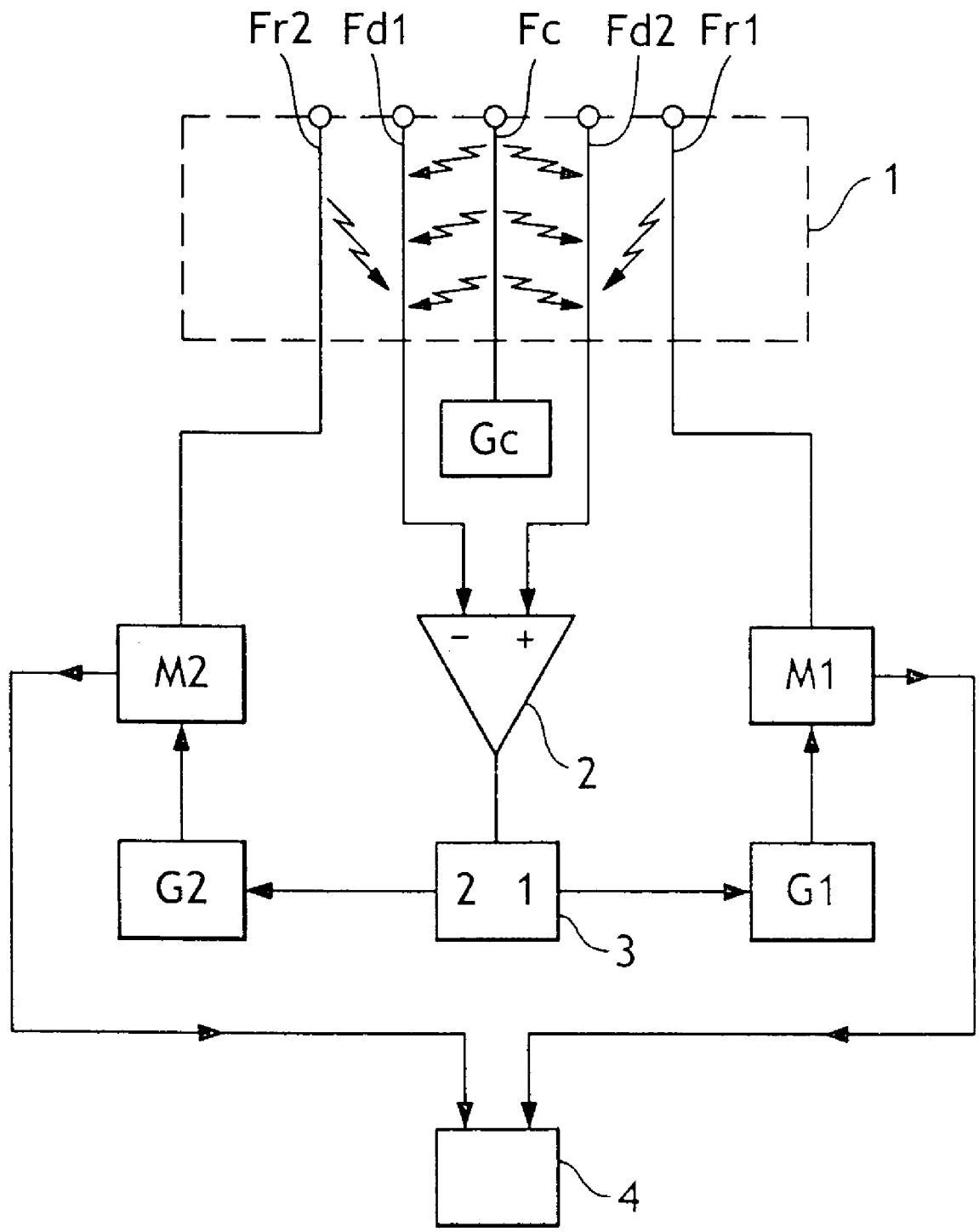

With reference to the FIGURE, the thermal accelerometer comprises in conventional manner, in particular as taught in the above-cited document, an enclosure 1 having disposed therein a central filament Fc between two detector filaments Fd1 and Fd2 having disposed adjacent thereto respective reaction filaments Fr2 and Fr1. The filament Fc has one end connected to a power supply member Gc. The detector filaments Fd1 and Fd2 are connected to the inputs of a comparator 2 whose output is connected to a selector 3 which serves to control power supply members G1 and G2 that are respectively connected to the reaction filaments Fr1 and Fr2 via measurement members M1 and M2, themselves connected to a member 4 for calculating acceleration. The general operation of the accelerometer is known from the above-cited document.

According to the invention, the electric current delivered to the central filament Fc is an alternating current of zero mean amplitude at a frequency that preferably lies between the first and second modes of resonant vibration of the central filament Fc. In practice, in order to ensure that the measurements performed by the accelerometer are independent of the vibration to which the accelerometer support is subjected, the first resonant mode of vibration of the central filament is about 6 kilohertz (kHz) so that the second resonant mode of vibration of the central filament is about 12 kHz. Under such circumstances, the central filament is preferably powered with current at a frequency of about 10 kHz. In this context, it should be observed that the AC power supply can deliver sinusoidal current for analog operation of the accelerometer, or it can deliver current pulses for digital operation of the accelerometer.

Similarly, in the same preferred embodiment as shown, the reaction filaments Fr1 and Fr2 are powered with an alternating reaction electric current having a zero mean amplitude and at a frequency that is greater than the first resonant mode of vibration of the reaction filaments, and that preferably lies between the first and second resonant modes of vibration of the reaction filaments.

Naturally, the invention is not limited to the embodiment described and various embodiments can be devised without going beyond the ambit of the invention as defined by the claims.

In particular, although the accelerometer of the invention is described with reference to an embodiment that includes reaction filaments, the invention can also be implemented in an accelerometer that has only a central filament and detector filaments.

What is claimed is:

1. A thermal accelerometer comprising an enclosure having disposed therein a central filament connected to a power supply member delivering electric current, and disposed between two detector filaments connected to a member for comparing the temperatures of the detector filaments, wherein the electric current delivered to the central filament is alternating current of zero mean amplitude and having a frequency greater than a first resonant mode of vibration of the central filament.

2. An accelerometer according to claim 1, wherein the alternating current is at a frequency lying between the first resonant mode of vibration of the central filament and a second resonant mode of vibration of the central filament.

3. An accelerometer according to claim 1, including reaction filaments adjacent to the detector filaments, the reaction filaments being connected to power supply members delivering reaction electric current, wherein the reaction electric current is alternating current at a zero mean amplitude and having a frequency greater than a first resonant mode of vibration of the reaction filaments.

4. An accelerometer according to claim 3, wherein the reaction alternating current has a frequency lying between the first resonant mode of vibration of the reaction filaments, and a second resonant mode of vibration of the reaction filaments.

* * * * *